United States Patent
Ferris et al.

(10) Patent No.: US 8,365,384 B2
(45) Date of Patent: *Feb. 5, 2013

(54) COUPLER FOR CABLE TROUGH

(75) Inventors: Matthew D. Ferris, Carver, MN (US); Alex Watts, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 982 days.

This patent is subject to a terminal disclaimer.

(21) Appl. No.: 11/382,341

(22) Filed: May 9, 2006

(65) Prior Publication Data

US 2006/0210356 A1    Sep. 21, 2006

Related U.S. Application Data

(62) Division of application No. 10/107,547, filed on Mar. 27, 2002, now Pat. No. 7,093,997.

(51) Int. Cl.
*B23P 19/00* (2006.01)
*F16B 7/00* (2006.01)
*F16B 7/04* (2006.01)

(52) U.S. Cl. ........... 29/426.6; 29/436; 29/437; 403/293; 403/325

(58) Field of Classification Search ............ 29/436, 29/437, 451, 453; 403/293, 325
See application file for complete search history.

(56) References Cited

U.S. PATENT DOCUMENTS

| 2,316,166 | A |   | 4/1943  | Huguelet |
| 2,741,499 | A |   | 4/1956  | Kussmaul |
| 2,821,154 | A |   | 1/1958  | Tennison, Jr. |
| 2,823,056 | A |   | 2/1958  | Di Meo et al. |
| 2,834,622 | A |   | 5/1958  | Reeves |
| 2,880,887 | A | * | 4/1959  | McClurg .................. 213/61 |
| 2,891,750 | A |   | 6/1959  | Bergquist |
| 3,022,972 | A |   | 2/1962  | Bunston |
| 3,042,351 | A | * | 7/1962  | Du Bois .................. 248/49 |
| 3,351,699 | A |   | 11/1967 | Merckle |
| 3,370,121 | A |   | 2/1968  | Merckle |
| 3,457,598 | A |   | 7/1969  | Mariani |
| 3,471,629 | A |   | 10/1969 | O'Leary |

(Continued)

FOREIGN PATENT DOCUMENTS

| DE | 3636412 A1 | 4/1988 |
| DE | 102 12 285 A1 | 11/2002 |

(Continued)

OTHER PUBLICATIONS

DITEL, Inc.; DITEL UPL-1000/UPT-1000/Corner Cable Guides; product information, 2 pages, © 1986.

(Continued)

*Primary Examiner* — Alexander P Taousakis
(74) *Attorney, Agent, or Firm* — Merchant & Gould P.C.

(57) ABSTRACT

Couplers for a cable trough system including a terminal end sized to receive a terminal end of a trough member along a longitudinal direction of the body. A spring may be coupled to the body for securing the terminal end of the trough member to the coupler, the spring including first and second spring arms extending generally in opposition to one another in a plane generally parallel to the longitudinal direction. The spring may be received in a slot formed by the trough member. Also included may be a spring release mechanism coupled to the body, the spring release mechanism sliding in the longitudinal direction between a locked position, such that the first and second spring arms engage the terminal end of the trough, and an unlocked position, such that the first and second fingers release the first and second arms of the spring.

8 Claims, 16 Drawing Sheets

U.S. PATENT DOCUMENTS

| | | | |
|---|---|---|---|
| 3,603,625 A | 9/1971 | Cottrell et al. | |
| 3,782,420 A | 1/1974 | Kolb et al. | |
| 3,875,618 A | 4/1975 | Schuplin | |
| 3,915,420 A | 10/1975 | Norris | |
| 4,099,749 A | 7/1978 | van Vliet | |
| 4,305,236 A | 12/1981 | Williams | |
| 4,854,665 A | 8/1989 | Gagnon | |
| 4,954,015 A | 9/1990 | McGowan | |
| 5,035,092 A | 7/1991 | Brant | |
| 5,038,528 A | 8/1991 | Brant | |
| 5,067,678 A | 11/1991 | Henneberger et al. | |
| 5,100,221 A | 3/1992 | Carney et al. | |
| 5,134,250 A | 7/1992 | Caveney et al. | |
| 5,142,606 A | 8/1992 | Carney et al. | |
| 5,161,580 A | 11/1992 | Klug | |
| 5,316,243 A * | 5/1994 | Henneberger | 248/68.1 |
| D348,651 S | 7/1994 | Hennegerger | |
| 5,469,893 A | 11/1995 | Caveney et al. | |
| 5,547,307 A | 8/1996 | Decore et al. | |
| 5,720,567 A | 2/1998 | Rinderer | |
| 5,752,781 A * | 5/1998 | Haataja et al. | 403/387 |
| 5,753,855 A | 5/1998 | Nicoli et al. | |
| 5,792,993 A | 8/1998 | Rinderer | |
| D402,262 S | 12/1998 | Scherer et al. | |
| D402,263 S | 12/1998 | Scherer et al. | |
| D413,306 S | 8/1999 | Scherer et al. | |
| 5,995,699 A | 11/1999 | Vargas et al. | |
| 5,998,732 A | 12/1999 | Caveney et al. | |
| D419,962 S | 2/2000 | Caveney | |
| 6,037,543 A | 3/2000 | Nicoli et al. | |
| D430,543 S | 9/2000 | Rohder | |
| 6,143,984 A | 11/2000 | Auteri | |
| 6,188,024 B1 | 2/2001 | Benito-Navazo | |
| 6,193,434 B1 | 2/2001 | Durin et al. | |
| D447,737 S | 9/2001 | Scherer et al. | |
| 6,402,418 B1 | 6/2002 | Durin et al. | |
| 6,424,779 B1 | 7/2002 | Ellison et al. | |
| 6,450,458 B1 * | 9/2002 | Bernard | 248/68.1 |
| 6,476,327 B1 | 11/2002 | Bernard et al. | |
| 6,512,875 B1 | 1/2003 | Johnson et al. | |
| 6,523,791 B2 | 2/2003 | Bernard et al. | |
| 6,634,605 B2 | 10/2003 | Bernard et al. | |
| 6,709,186 B2 | 3/2004 | Ferris et al. | |
| 6,715,719 B2 | 4/2004 | Nault et al. | |
| 7,029,195 B2 | 4/2006 | Nault | |
| 7,093,997 B2 | 8/2006 | Ferris | |
| 7,246,778 B2 | 7/2007 | Caveney et al. | |
| 7,360,743 B2 | 4/2008 | Ferris | |
| 2002/0006312 A1 | 1/2002 | Buard | |
| 2002/0096606 A1 | 7/2002 | Bernard et al. | |
| 2003/0183731 A1 | 10/2003 | Ferris et al. | |
| 2004/0159750 A1 | 8/2004 | Ferris et al. | |
| 2006/0261240 A1 | 11/2006 | Nault | |

FOREIGN PATENT DOCUMENTS

| | | |
|---|---|---|
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1160950 A2 * | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 | 4/2002 |
| WO | 02/33445 | 4/2002 |
| WO | 02/086576 A1 | 10/2002 |

OTHER PUBLICATIONS

ADC Telecommunications, Inc.; FiberGuide™, Fiber Management System, 6 pages front and back printed, Jun. 1989.

Panduit Network Connectivity Group, FiberRunner™ 6×4 Routing System Product Brochure, 2 pages, © Panduit Corp. 2000.

Panduit Corp. FiberRunner™ 4×4 Quiklock™ Coupler (FRBC4X4) Customer Drawing, 1 page, Jul. 13, 2001.

Panduit Corp. FiberRunner™ 6×4 Quiklock™ Coupler (FRBC6X4) Customer Drawing, 1 page, May 10, 2000.

Photographs of various Panduit products.

Parduit Corp. FiberRunner™ 6×4 Quiklock™ Coupler (FRBC6X4) Customer Drawing, 1 page, May 10, 2000.

Panduit Corp. FiberRunner™ 12×4 Quiklock™ Coupler (FRBC12X4) Customer Drawing, 1 page, Jan. 3, 2001.

* cited by examiner

COUPLER FOR CABLE TROUGH

RELATED APPLICATIONS

This application is a divisional of application Ser. No. 10/107,547, filed Mar. 27, 2002, now U.S. Pat. No. 7,093,997 which application is incorporated herein by reference.

TECHNICAL FIELD

The present invention relates to a system for the management and routing of telecommunication cables, and, more particularly, to a coupler for joining two or more trough members.

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678, 5,316,243, and 5,752,781 teach cable routing systems that include a plurality of trough members and couplers.

Various concerns arise in the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected.

SUMMARY

A coupler for a cable trough system according to one aspect of the invention may include a body including a bottom wall and two side walls defining a trough, the body having a body terminal end defining an overlap region, the overlap region being sized to slideably receive a terminal end of a trough member along a longitudinal direction of the body, and a spring coupled to the body and positioned in the overlap region for securing the terminal end of the trough member to the coupler, the spring including first and second spring arms extending generally in opposition to one another in a plane generally parallel to the longitudinal direction.

In another aspect, the invention relates to a cable trough system including a body including walls defining a bottom wall and two side walls defining a trough, the body having a body terminal end defining an overlap region, the overlap region being sized to slideably receive a terminal end of a trough member along a longitudinal direction of the body, and a spring coupled to the body and positioned in the overlap region for securing the terminal end of the trough member to the coupler, the spring including first and second spring arms aligned in a plane extending in a direction non-transverse with respect to the longitudinal direction.

In yet another aspect, the invention relates to a coupler for a cable trough system including a body including walls defining a bottom wall and two side walls defining a trough, the body having a body terminal end defining an overlap region, the overlap region being sized to slideably receive a terminal end of a trough member along a longitudinal direction of the body, and a spring coupled to one of the walls of the body for securing the terminal end of the trough member to the coupler, the spring including a first arm that is moveable in a plane generally parallel to the one wall between a locked position and an unlocked position.

In another aspect, the invention relates to a locking mechanism for coupling a coupler with a trough member including a main body including a first railway extending in a longitudinal direction, a first spring including first and second arms aligned in a plane generally parallel with respect to the longitudinal direction, the first spring being coupled to the main body, and a first spring release including first and second fingers, the first spring release slidingly engaging the first railway of the main body so that the first spring release slides in the longitudinal direction between a locked position, wherein the first and second fingers release the first and second arms of the first spring, and an unlocked position, wherein the first and second fingers compress the first and second arms of the first spring towards one another to release the locking mechanism and the coupler from the trough member.

In another aspect, the invention relates to a cable trough system comprising a trough member having a terminal end and including first and second sidewalls coupled to a bottom wall generally forming a trough, the trough member defining a slot, a coupler including a body including a bottom wall and two side walls defining a trough, the body having a body terminal end defining an overlap region, the overlap region being sized to slideably receive the terminal end of the trough member along a longitudinal direction of the body, and a spring coupled to the coupler, wherein the spring is received in the slot when the trough member is inserted into the coupler to couple the trough member to the coupler.

In yet another aspect, the invention relates to a coupler for a cable trough system including a trough member having a terminal end, the coupler including a body having an open end and including first and second guiding surfaces defining a spacing, the spacing being sized to receive the terminal end, with the first guiding surface slideably engageable with an internal wall surface of the terminal end and with the second guiding surface slideably engageable with the external wall surface of the terminal end, a spring coupled to the body and including first and second spring arms aligned in a plane generally parallel to the first and second guiding surfaces, and a spring release mechanism coupled to the body including a spring release, wherein, when the terminal end of the trough member is inserted into the coupler body, the first and second spring arms engage opposing portions of the trough member defining a slot, and wherein the spring release releases the first and second arms from engagement with the opposing portions when the spring release is slid in a direction parallel to the first and second guiding surfaces.

In another aspect, the invention relates to a method for using a coupler and a trough member, the method including steps of: providing a terminal end of the trough member coupled to the coupler, wherein the terminal end was inserted in a longitudinal direction into a spacing defined by the coupler; sliding a spring release in the longitudinal direction to disengage a spring from portions of the trough member defining a slot; and removing the terminal end of the first trough member from the spacing.

In yet another aspect, the invention relates to a method for using a coupler and a trough member including steps of: providing a terminal end of the trough member, the trough member defining a slot; providing a coupler defining a spacing and including a locking element with a spring; and inserting the terminal end of the trough member in a longitudinal direction into the spacing defined by the coupler so that the locking element is at least partially received in the slot, thereby coupling the terminal end of the trough member to the coupler.

DETAILED DESCRIPTION OF THE PREFERRED EMBODIMENT

As used herein, the terms "couple" and "coupled" mean to join or attach one element in relation to a second element, whether the attachment is made directly with the second element or indirectly through intermediate components. As used herein, the term "slot" means a space defined by one or more surfaces and may include, without limitation, T-slots, closed slots, flanges, and projections.

Figure 1:
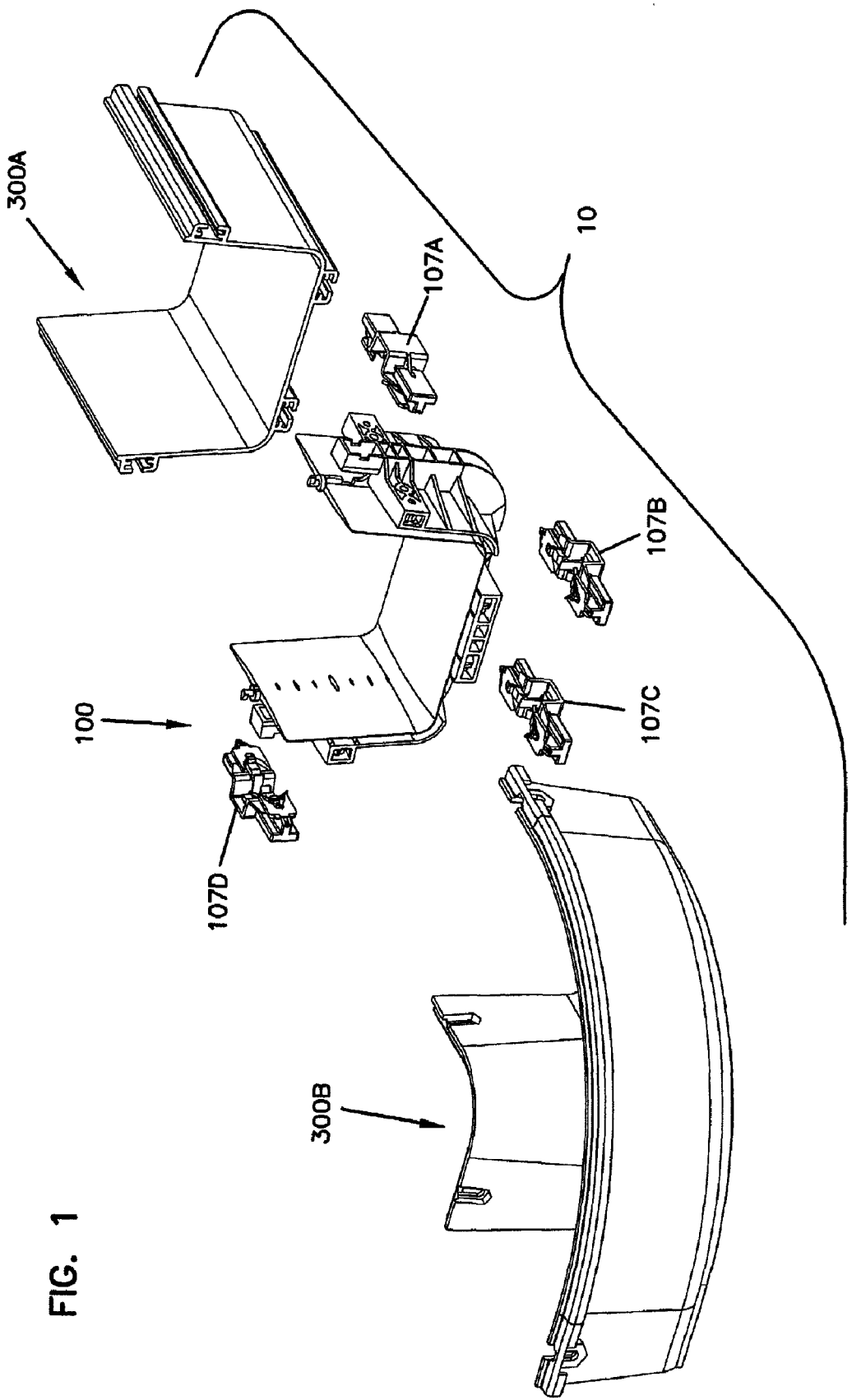
FIG. 1 is a perspective view of an embodiment of a trough system in accordance with the present invention shown in exploded form.

FIG. 1 shows an example of a trough system 10 that is an embodiment of the present invention. The system 10 includes a coupler 100 for interconnecting trough members 300A and 300B. The coupler 100 includes a locking mechanism having at least one locking element. In the embodiment shown, four locking elements 107A, 107B, 107C, and 107D are providing secure connection between the coupler 100 and a trough member, such as trough member 300A. The coupler 100 may also provide secure connections with one or more additional trough members, such as trough member 300B. In addition, the coupler may be configured to release the connections between the coupler 100 and the trough members 300A and 300B. In an example embodiment, the locking mechanism is tool-less (i.e., the locking mechanism does not require the use of a separate tool). However, locking mechanisms required to be engaged by an auxiliary tool are also within the scope of the present invention.

I. Coupler

Figure 12:
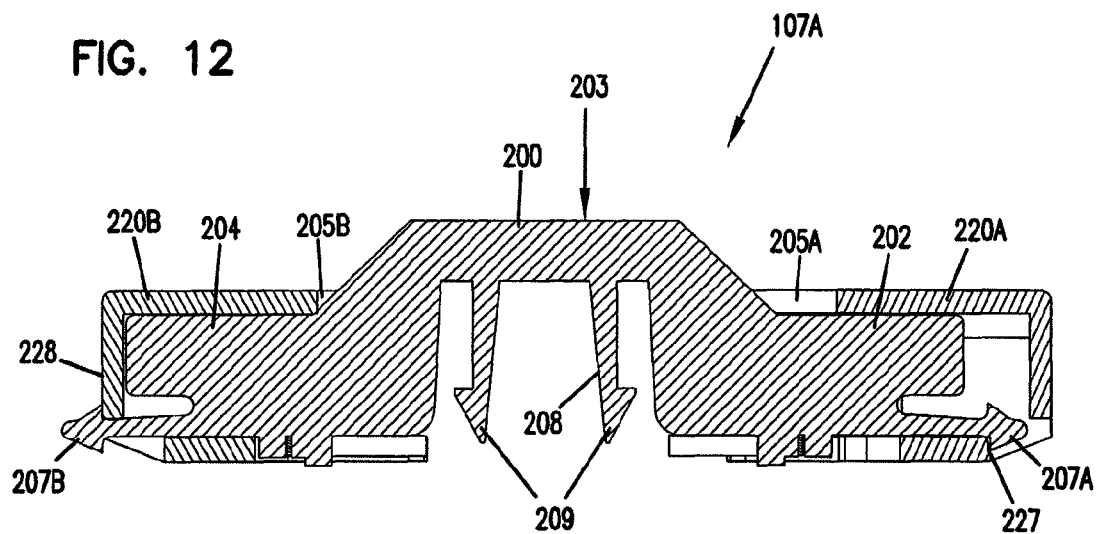
FIG. 12 is cross-sectional top view along line 12-12 of FIG. 9.

As shown in FIGS. 2-6, the coupler 100 includes a first guiding surface 101 and a second guiding surface 102 at least partially surrounding the first guiding surface 101, as well as a first coupler end 110 and a second coupler end 111. A spacing 103 is defined between the first guiding surface 101 and the second guiding surface 102. The spacing 103 is sized to receive a trough member (see, e.g., trough member 300 of FIGS. 12-14) or other trough system component inserted into the spacing 103 in a longitudinal direction 190.

Figure 3:
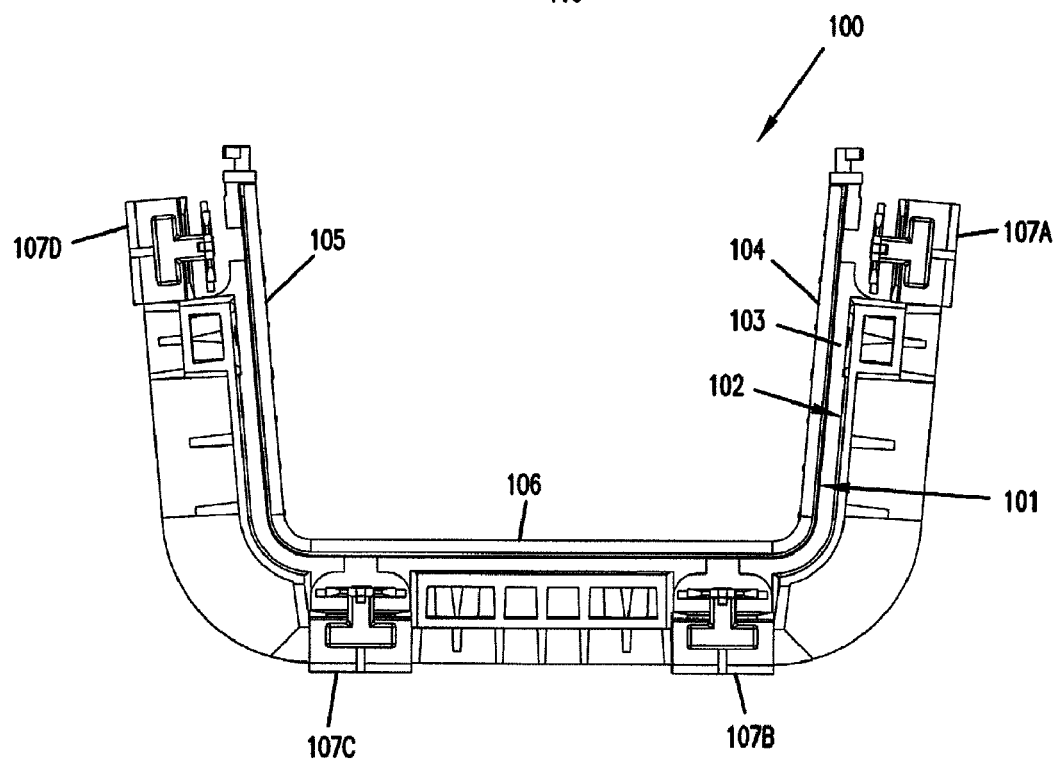
FIG. 3 is an end view of the coupler shown in FIG. 2.
Figure 4:
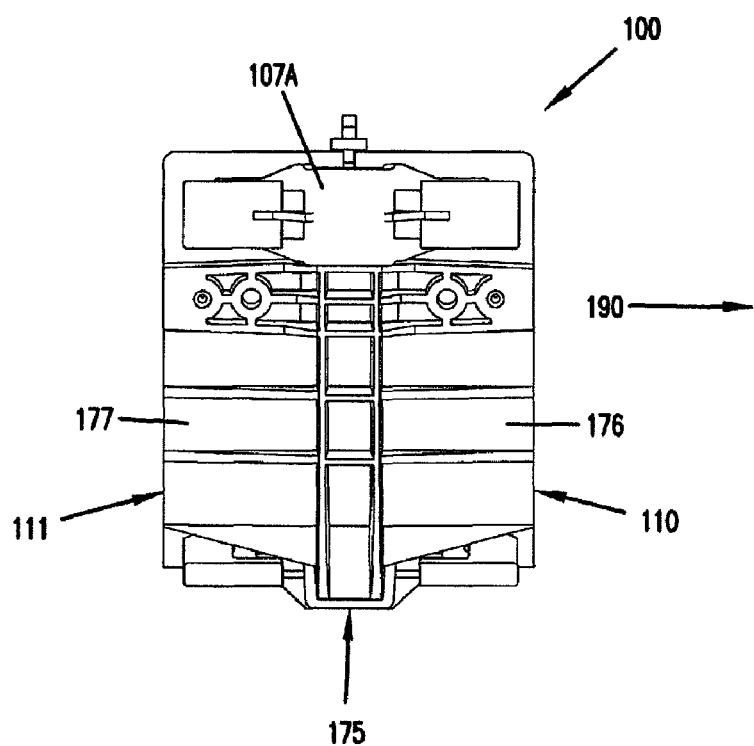
FIG. 4 is a side view of the coupler shown in FIG. 2.
Figure 5:
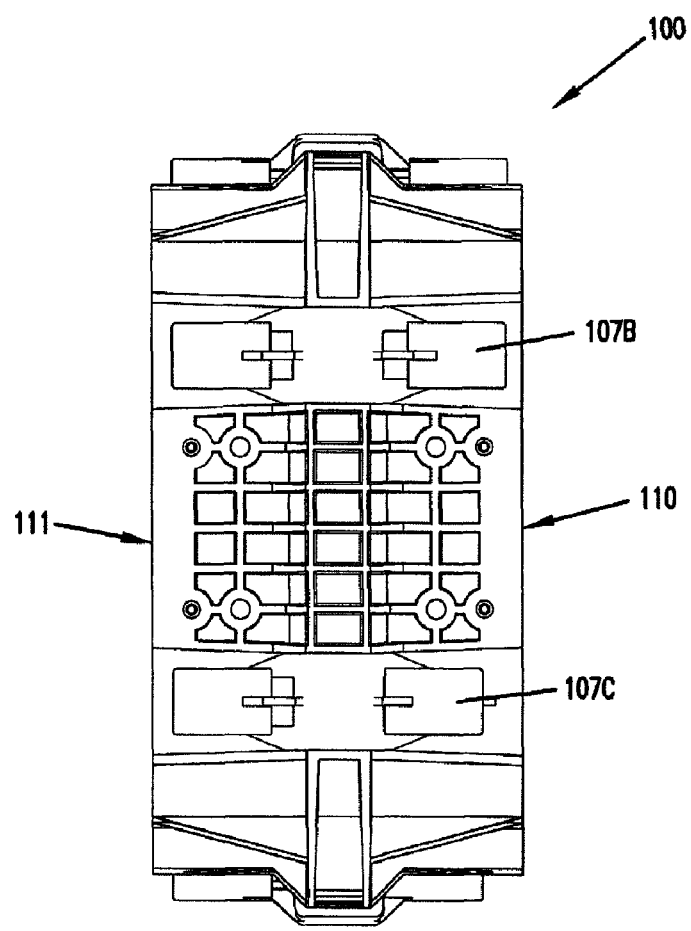
FIG. 5 is a bottom view of the coupler shown in FIG. 2.

As shown in FIG. 3, the first guiding surface 101 of the coupler 100 is generally in the shape of a trough, including a first side wall portion 104 and a second side wall portion 105, as well as a bottom wall portion 106 joining the first and second side wall portions 104 and 105. As used herein, the term "trough" means any structure that defines an interior in which an element such as an optical cable can be maintained. The second guiding surface 102 is also in the shape of a trough. A midpoint or midsection 175 divides the coupler 100 into first and second halves 176 and 177, and generally surrounds at least a portion of the first guiding surface 101.

As indicated above, the locking mechanism of the coupler is used to secure trough members to the ends 110 and 111 of the coupler 100. The locking elements 107A, 107B, 107C, and 107D of the locking mechanism are coupled to an exterior of the coupler 100, using, for example, a clip 208 as shown in FIGS. 7-10 and described below.

Although the first locking element 107A is described in detail below, the second, third, and fourth locking elements 107B, 107C, and 107D have an identical structure and function similarly in the illustrated embodiment.

The locking element 107A is shown in isolation in FIGS. 7-12. The locking element 107A includes a main body 200, springs 210A and 210B, and spring releases 220A and 220B. The main body 200 includes a first portion 202 and a second portion 204 coupled by a bridge 203. The main body further includes railways 205A and 205B, T-shaped detents 207A and 207B, and the clip 208.

Figure 8:
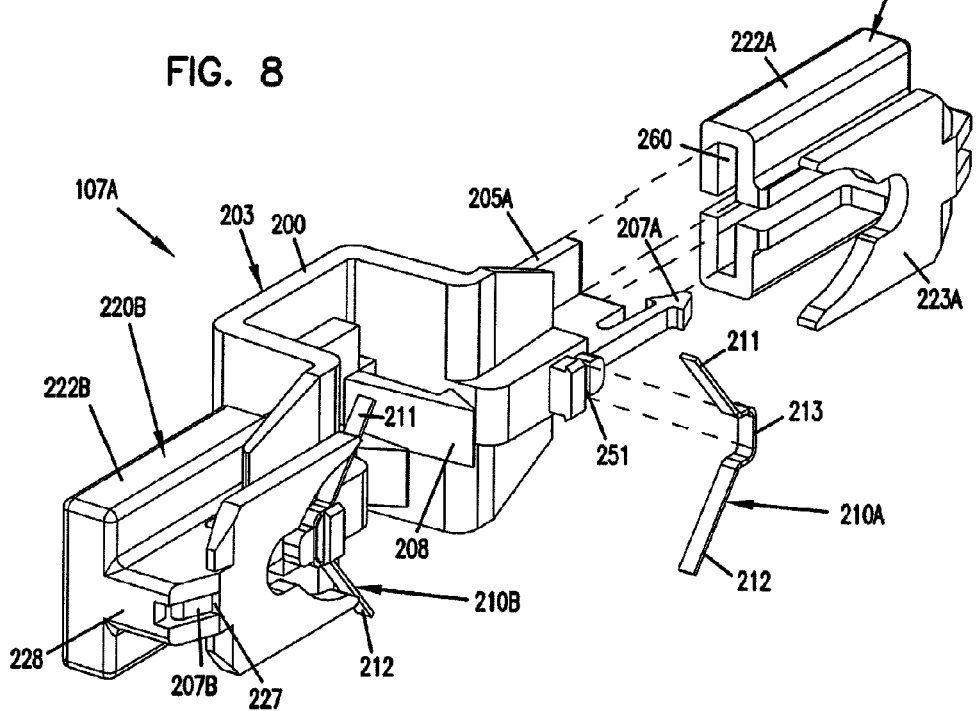
FIG. 8 is another perspective view of the locking element shown in FIG. 7 with one spring and spring release shown in exploded view.
Figure 9:
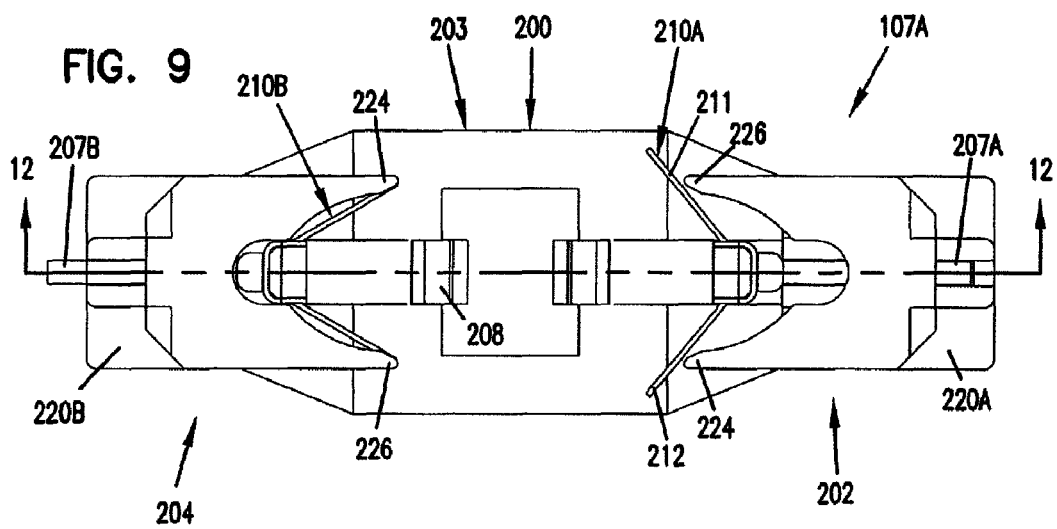
FIG. 9 is an inside view of the locking element shown in FIG. 7.
Figure 10:
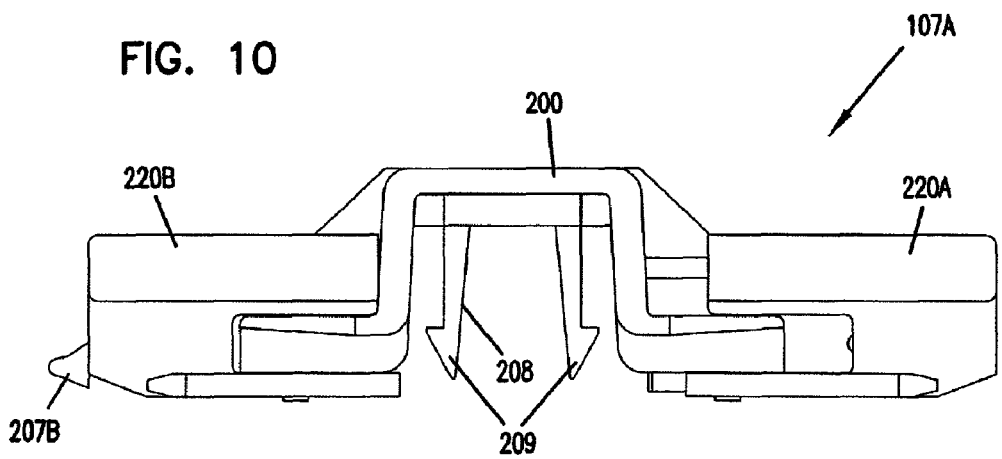
FIG. 10 is a top view of the locking element shown in FIG. 7.
Figure 11:
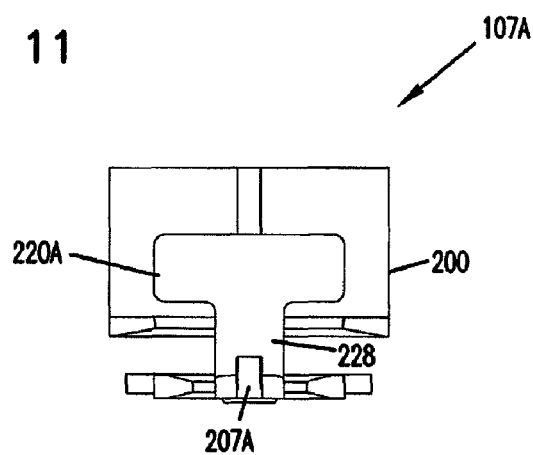
FIG. 11 is an end view of the locking element shown in FIG. 7.

The spring 210A, shown in exploded form in FIG. 8, includes first and second arms 211 and 212 coupled by a bridge 213. The first and second arms 211 and 212 are positioned to extend generally at an angle in opposition to one another. As used herein, to extend "generally in opposition" means to extend at diverging angles with respect to one another. In addition, the first and second arms are aligned generally in a plane. The spring 210A may be coupled to the coupler 100 by press-fitting the spring 210A into a slot 251 defined on the main body 200. The spring 210B is similarly configured. Preferably, springs 210A and 210B are one-piece, V-shaped leaf springs made of metal.

Although the example springs 210A and 210B are shown, other spring configurations may also be used. For example, a spring including a single arm, or arms extending at different angles to those shown, may also be used.

The spring release 220A includes a sliding portion 222A and a finger portion 223A with fingers 224 and 226. The sliding portion 222A defines an aperture 260 that is configured to slidingly engage and ride along the railway 205A between a locked position and an unlocked position. The spring release 220A is maintained on the railway 205A by the detent 207A that engages an edge 227 of the finger portion 223A as the spring release 220A is slid longitudinally in a direction away from the bridge 203 (i.e., the locked position).

The fingers 224 and 226 of the finger portion 223A are positioned to engage the spring arms 211 and 212 as the spring release 220A is slid longitudinally in a direction towards the bridge 203 from the locked position to the unlocked position. In the locked position, as shown, for example, in FIGS. 7 and 9, the fingers 224 and 226 of the spring release 220A release the spring arms 211 and 212 of the spring 210A. As the spring release 220A is slid towards the bridge 203 and the unlocked position, the fingers 224 and 226 push the spring arms 211 and 212 towards one another.

In a fully engaged or the unlocked position, as shown by the spring release 220B, the fingers 224 and 226 of the spring release 220B fully engage the spring arms 211 and 212 of the spring 210B. It is therefore possible for one spring release of the locking element 107A to be in the locked position, while the other spring release is in the unlocked position. For example, in FIG. 7, the spring release 220A is in the unlocked position, while the spring release 220B is in the locked position.

With no external force being applied, the spring release 220A is forced by the spring 210A into the locked position. However, the spring release, as is shown by the spring release 220B in FIGS. 7 and 12, may be maintained in the unlocked position by the detent 207B that engages an edge 228 of the sliding portion 222B of the spring release 220B when the spring release is placed in the fully unlocked position. The spring release 220A is similarly configured.

Other configurations for the spring release, and specifically, the fingers, are also possible. For example, the fingers may be positioned to engage a portion of the spring arms closer to the bridge of the spring, thereby allowing for greater movement of the spring arms by the fingers. In addition, the spring release may optionally be removed from the locking element.

Figure 2:
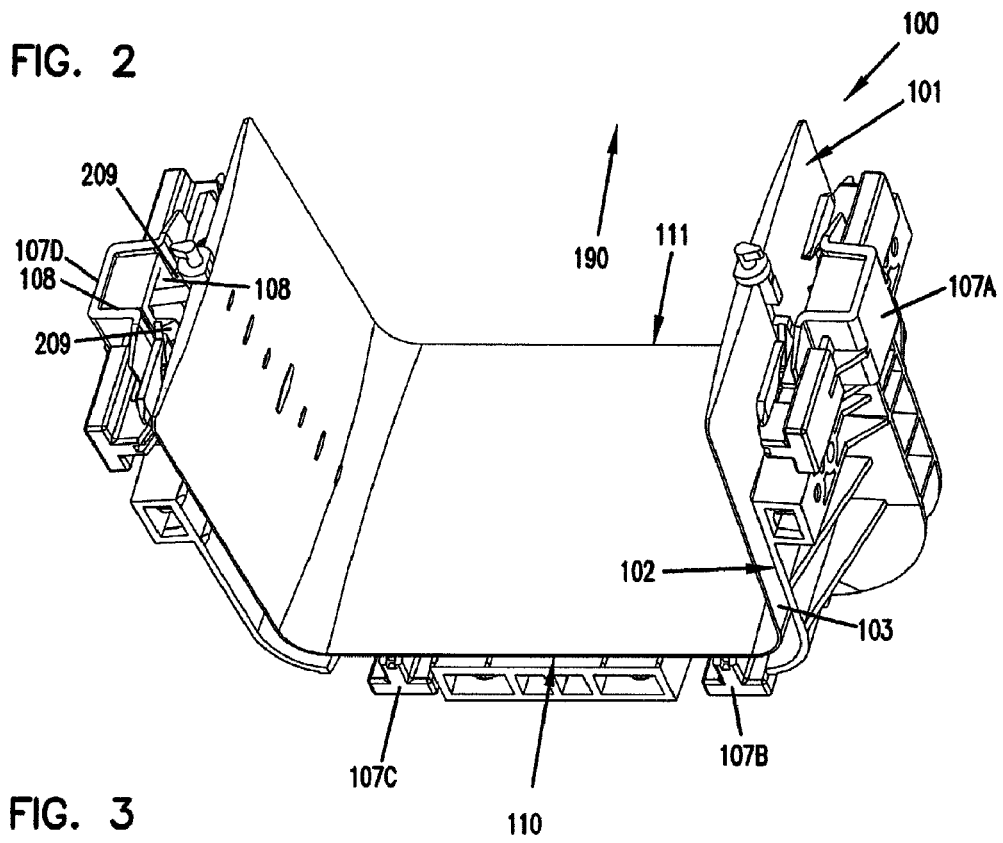
FIG. 2 is a perspective view of an embodiment of a coupler in accordance with the present invention.
Figure 6:
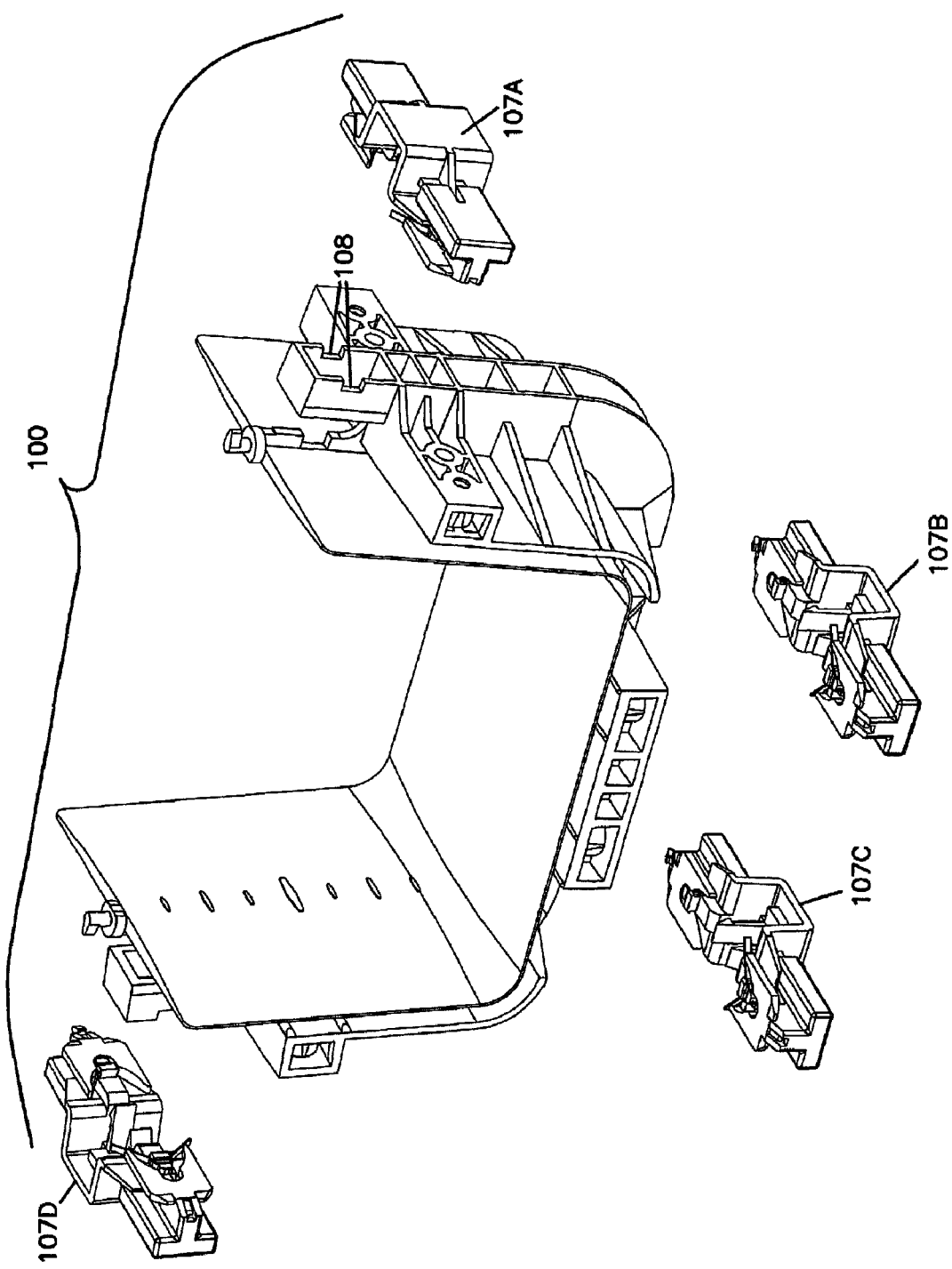
FIG. 6 is a perspective view of the coupler of FIG. 2 with one of the locking elements shown in exploded view.
Figure 7:
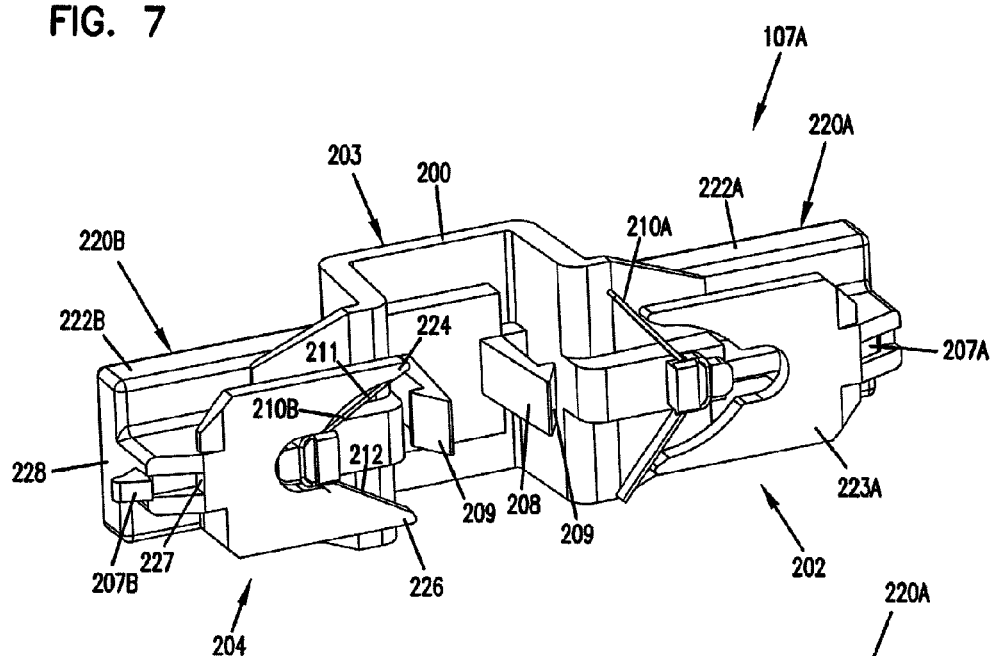
FIG. 7 is a perspective view of an embodiment of a locking element in accordance with the present invention.

As noted above, the locking element 107A is coupled to the coupler 100 using the clip 208 extending from the bridge 203 of the locking element 107A, as is shown in FIGS. 7-10 and 12. As shown in FIGS. 2 and 6, the clip 208 is sized to extend through an interior portion defined by walls 108 on the coupler 100, and detents 209 on the end of the clip 208 engage an edge of the walls 108 facing the coupler, thereby coupling the locking element 107A to the coupler 100. This configuration for attaching the locking element to the coupler may be advantageous, for example, because the locking element can be snap-fit onto the coupler at the desired time. In addition, it is possible to replace a locking element, if needed.

II. Trough

Figure 15:
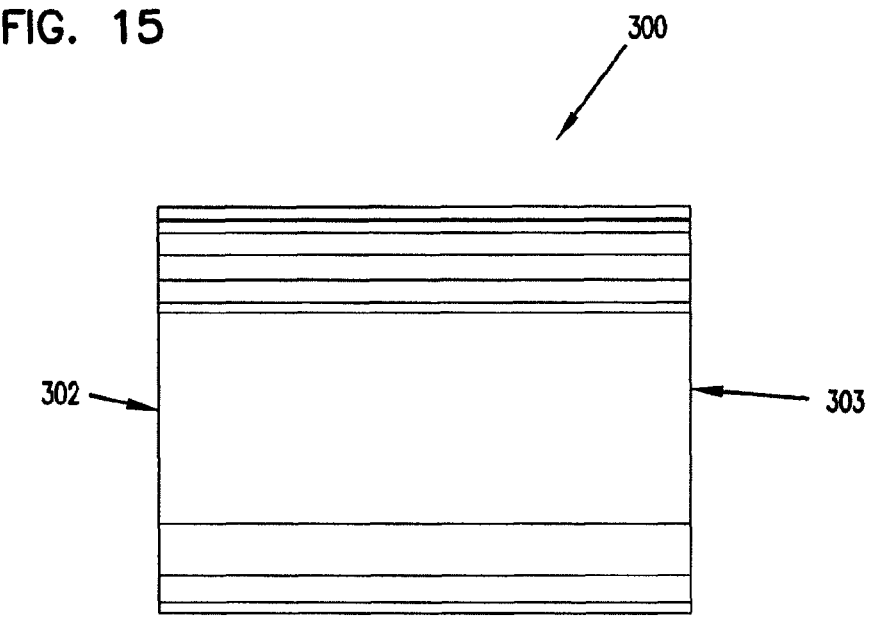
FIG. 15 is a side view of the trough member shown in FIG. 13.
Figure 13:
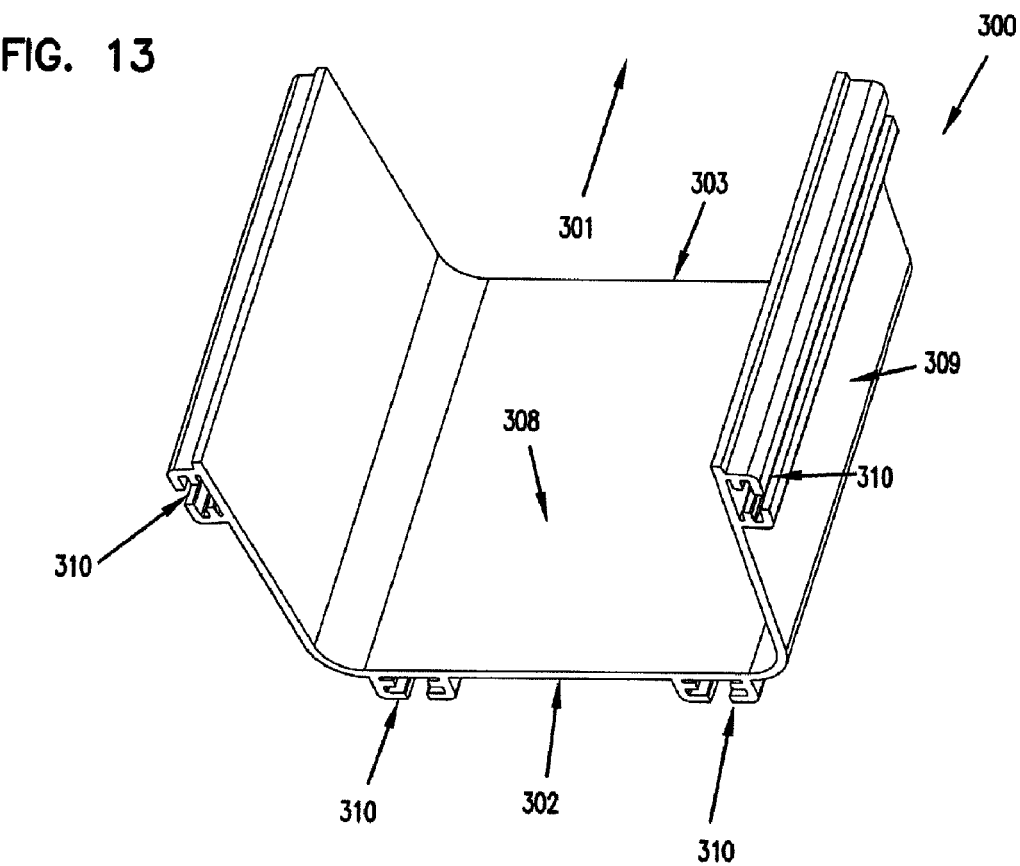
FIG. 13 is a perspective view of an embodiment of a trough member in accordance with the present invention.
Figure 14:
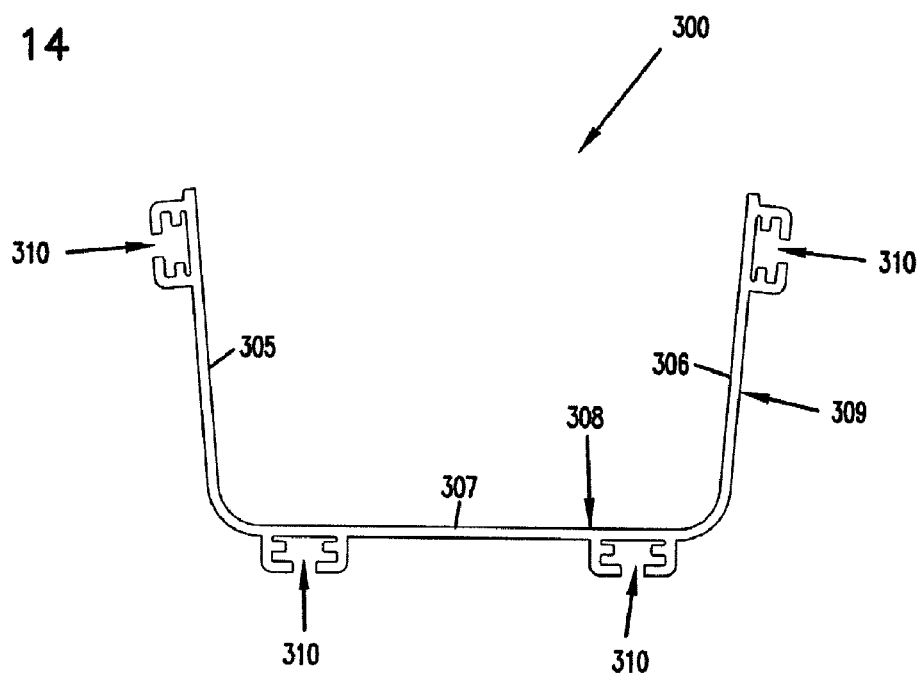
FIG. 14 is an end view of the trough member shown in FIG. 13.
Figure 16:
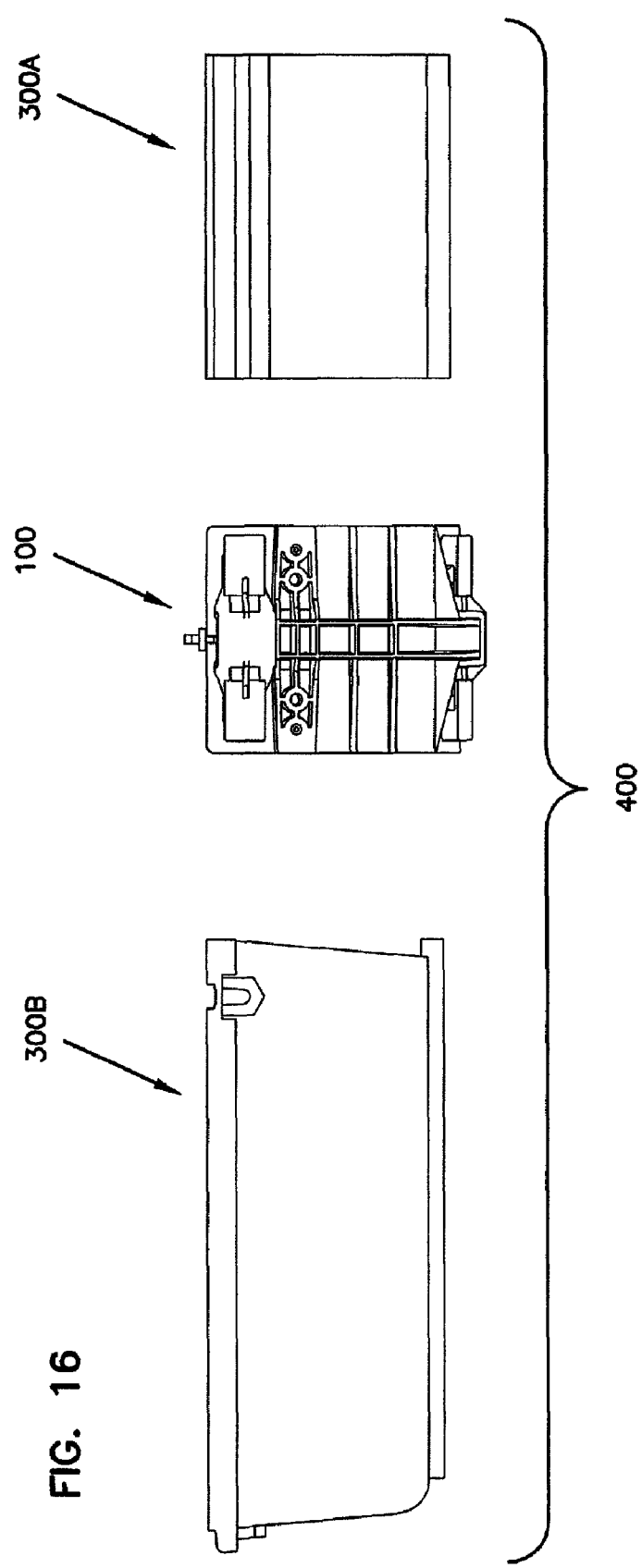
FIG. 16 is a side view of an embodiment of a trough system including a coupler and two trough members in exploded view in accordance with the present invention.
Figure 17:
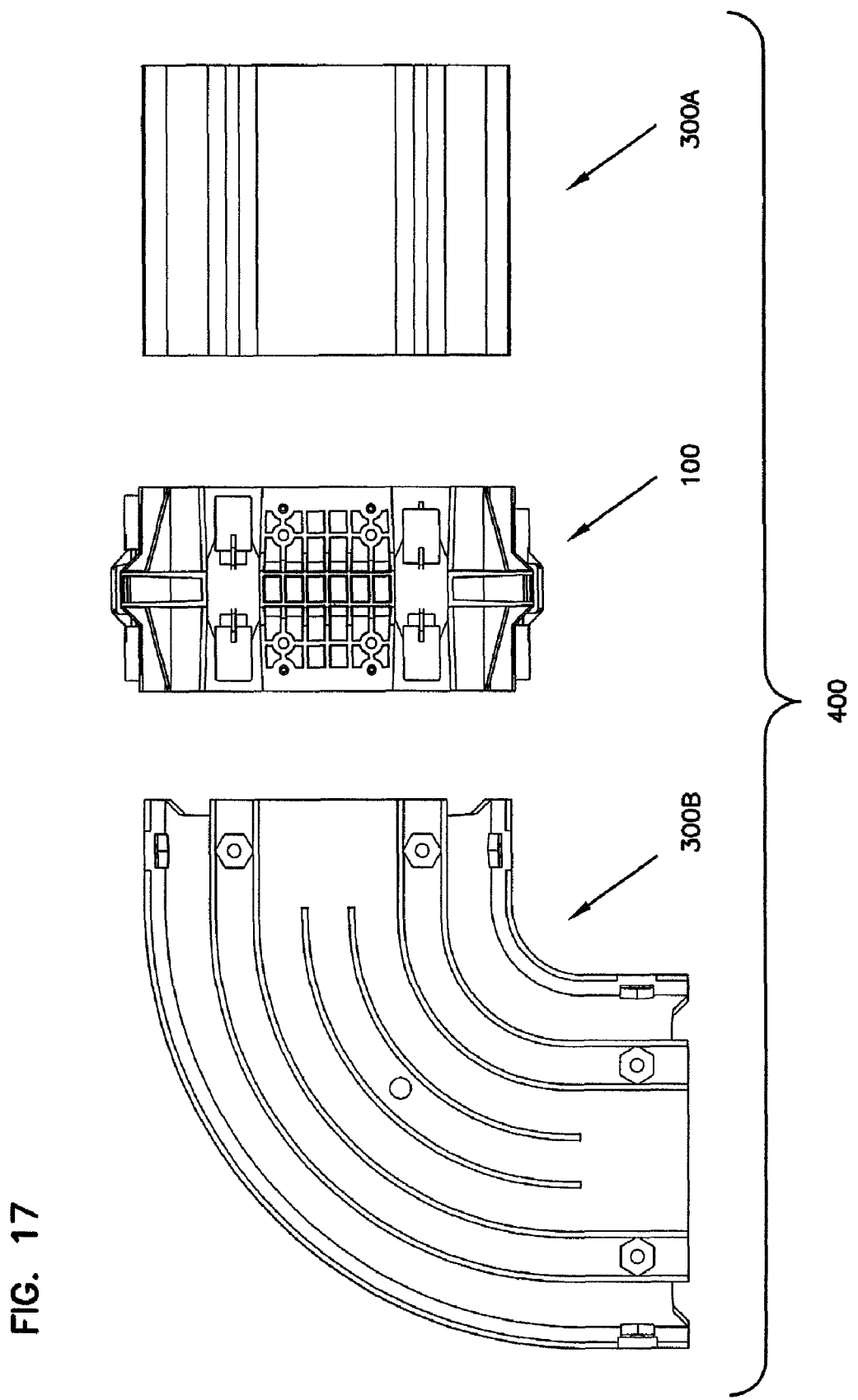
FIG. 17 is a bottom view of the trough system shown in FIG. 16.
Figure 18:
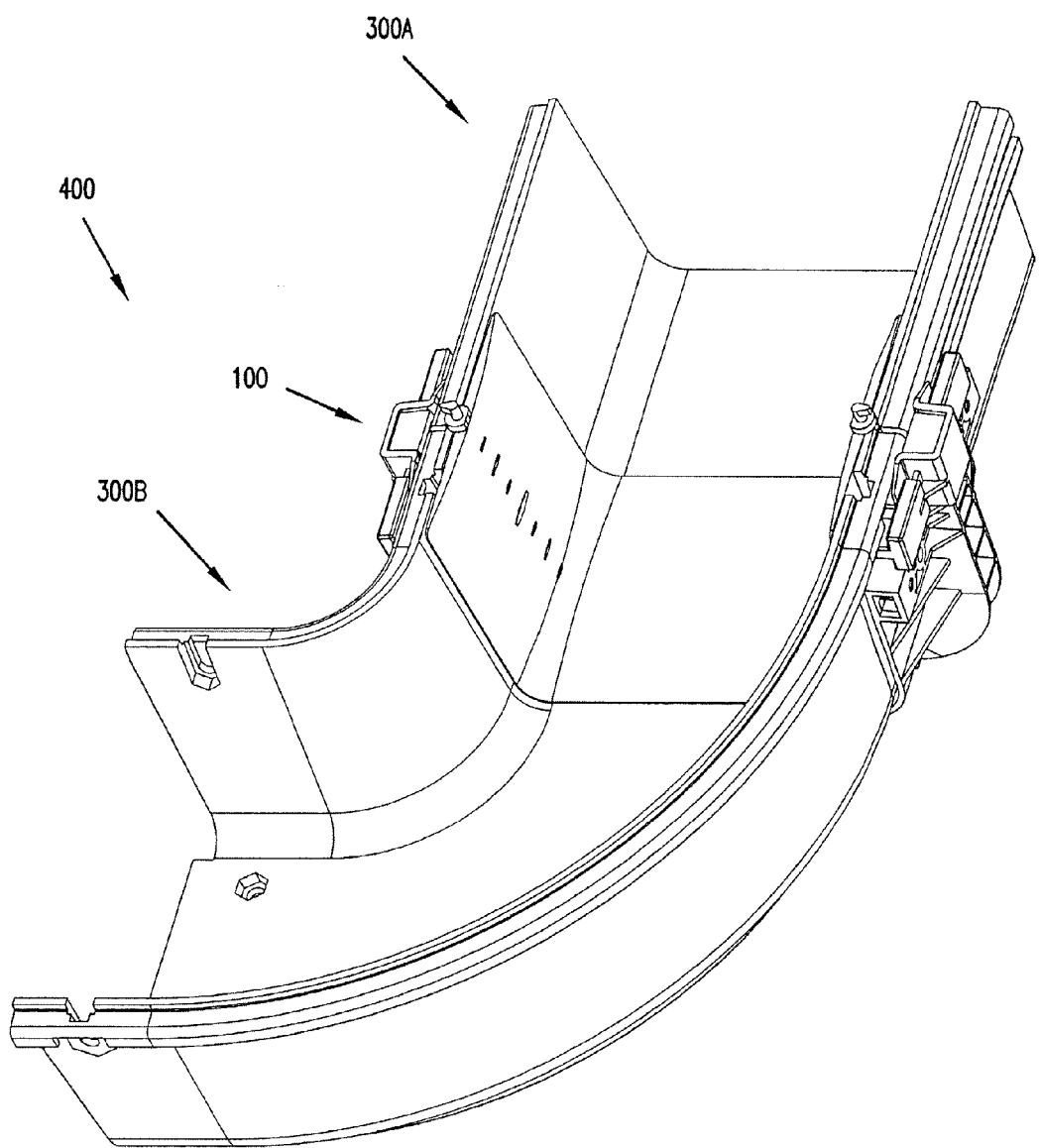
FIG. 18 is a perspective view of the trough system shown in FIG. 16 in assembled form.

Referring now to FIGS. 13-15, an example embodiment of a trough member 300 is shown according to the present invention. As used herein, the term trough member is used to refer to any trough, fitting, railway, raceway, or similarly configured component including any number of ends. Although a specific embodiment of a trough member is shown in and described with respect to FIGS. 13-15, any other trough member may also be used.

The trough member 300 includes a first terminal end 302 and a second terminal end 303. The trough member 300 is generally in the shape of a trough including first and second side walls 305 and 306 coupled by a bottom wall 307, thereby defining an interior surface 308 and an exterior surface 309. Walls 305, 306 and 307 are each generally planar. The exterior surface 309 define one or more slots 310 on the side walls 305 and 306 and bottom wall 307. The slots 310 extend in a longitudinal direction 301 of the trough member 300 from the first terminal end 302 to the second terminal end 303. Typically, slots will be provided for at least one, and preferably each, locking element, as described further below.

Alternative configurations and placement for the slots 310 are also possible. For example, the slots 310 may be T-slots, as shown on the example embodiment of the trough 300. As used herein, the term "T-slot" means a slot having a narrow access opening and a wider interior region. In addition, the slots 310 may also be flanges or opposing projections. For example, the trough member 300B, known to those skilled in the art as a fitting and shown in FIGS. 16-23, includes slots defined by flanges 370 on side walls (see FIG. 19) and slots defined by opposing projections 371 and 372 on the bottom wall (see FIG. 22), rather than T-slots. Other configurations are possible. Preferred slot configurations include at least two opposing surfaces that extend in the longitudinal direction 301, although a single surface may also be used. The slots 310 may not extend fully between the terminal ends of the trough member. The placement of the slots on the exterior surface of the trough members may be altered. More or fewer slots may also be provided.

III. System

Referring now to FIGS. 16-23, an embodiment of a trough system 400 is shown including the coupler 100 as well as first and second trough members 300A and 300B. As illustrated, the terminal ends of the trough members 300A and 300B may be slidingly engaged in the spacing 103 between the first and second guiding surfaces 101 and 102 of the coupler 100. In other words, the thickness of the walls of each of the trough members 300A and 300B, or the distance between the inner and outer surfaces, are sized to fit within the spacing 103 of the coupler 100. The coupler 100 overlaps the terminal ends of each of the trough members 300A and 300B to form the coupling, the overlap defining an overlap region.

Figure 19:
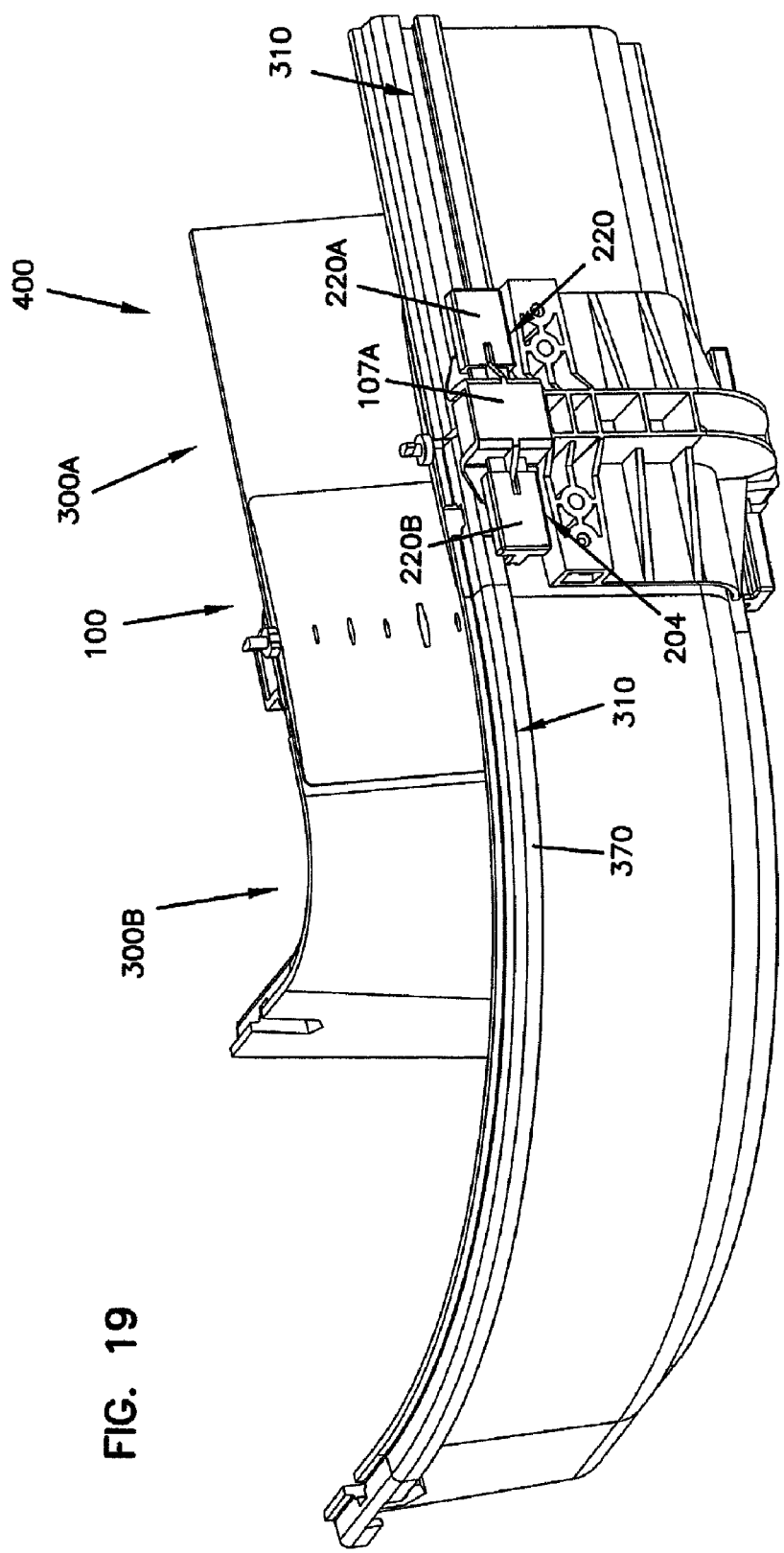
FIG. 19 is an enlarged perspective view of a portion of the trough system shown in FIG. 18 from a different angle.
Figure 20:
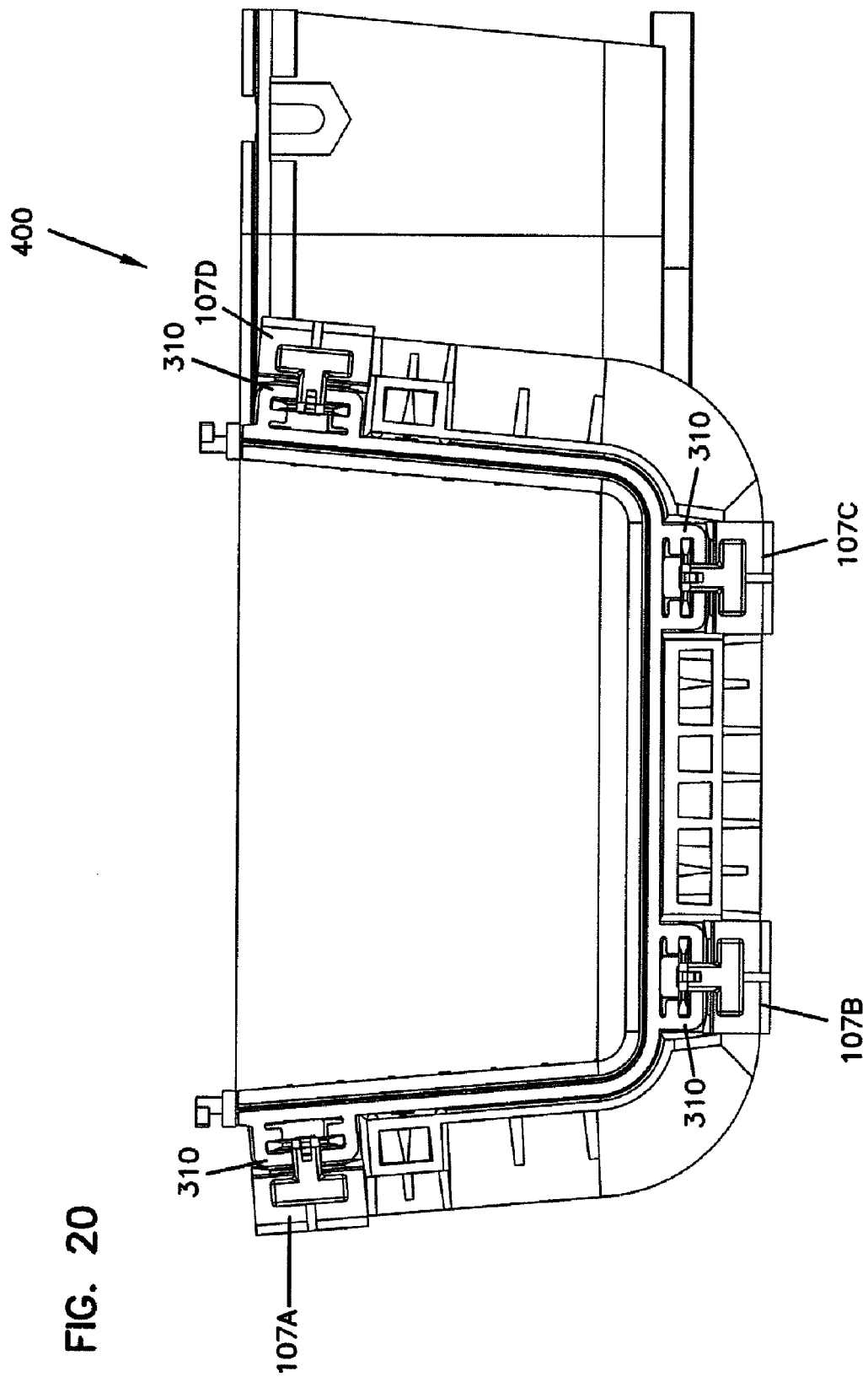
FIG. 20 is an end view of the trough system shown in FIG. 18.

As each trough member is inserted into a respective end of the coupler 100, a portion of each locking element is slidingly received within each corresponding slot. For example, as shown in FIG. 19, at least part of the first portion 202 of the locking element 107A is partially received within the slot 310 of the trough member 300A. Similarly, at least part of the second portion 204 of the locking element 107A is received in a corresponding slot 310 of trough member 300B.

Figure 21:
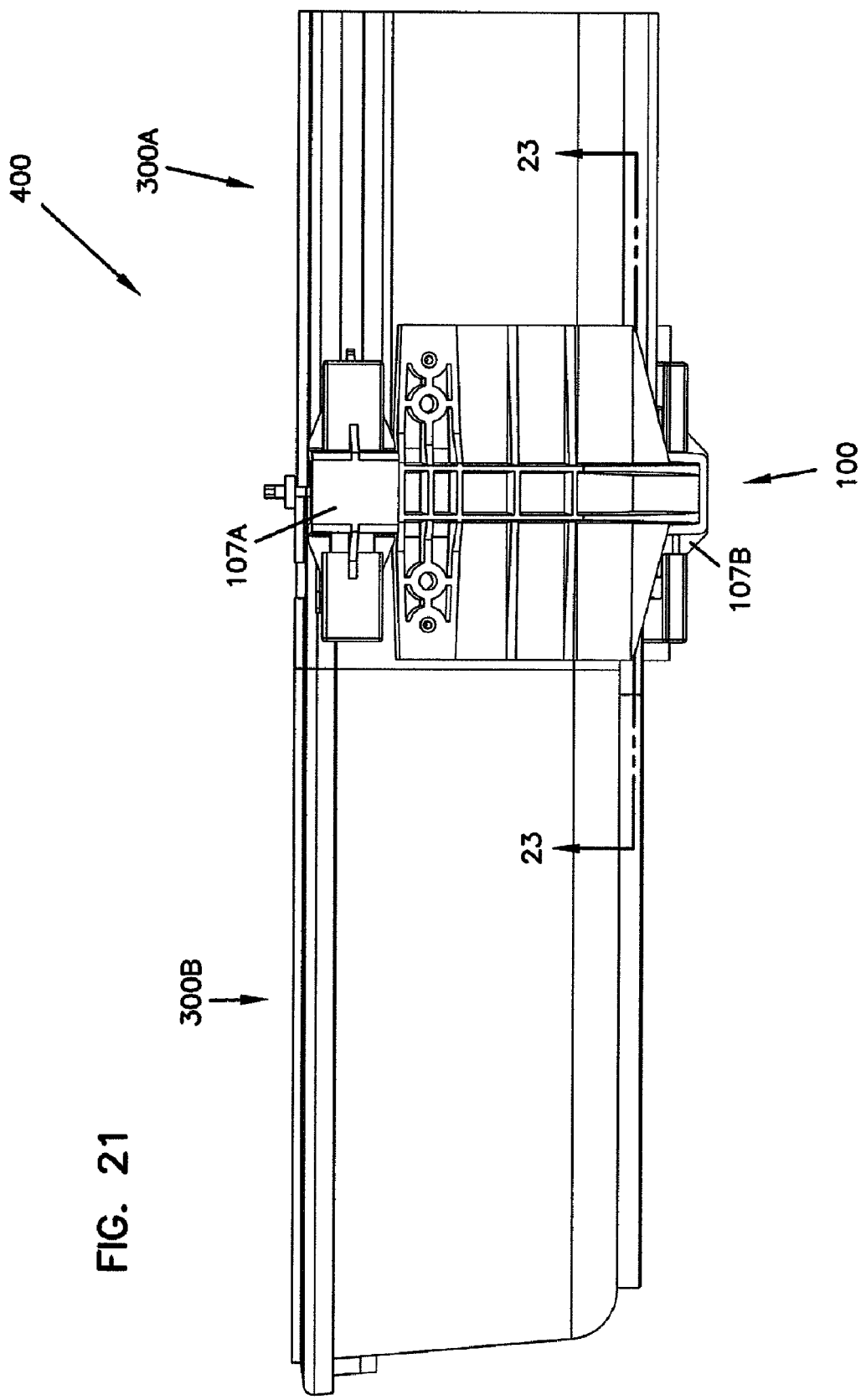
FIG. 21 is a side view of the trough system shown in FIG. 18.
Figure 22:
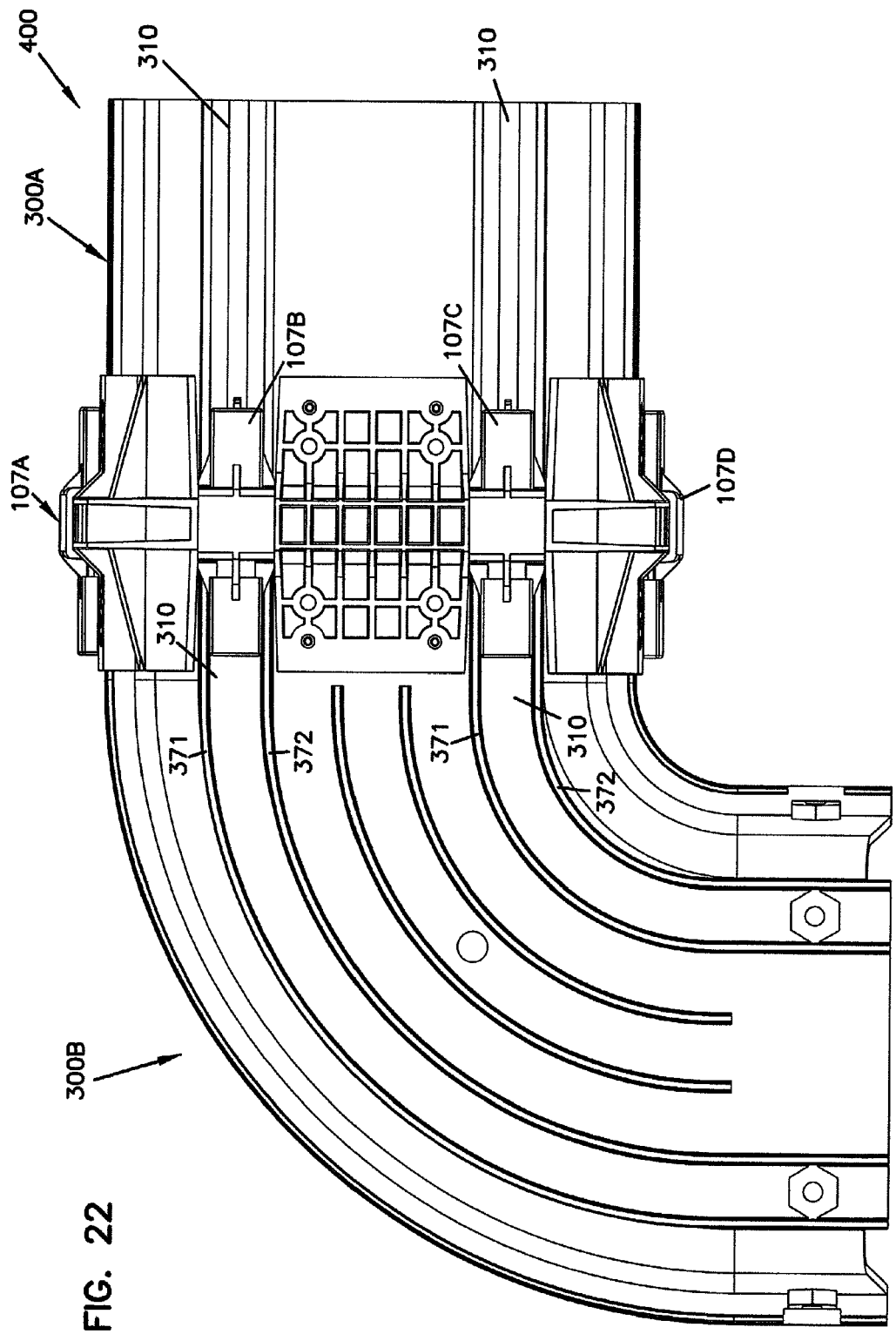
FIG. 22 is a bottom view of the trough system shown in FIG. 18.
Figure 23:
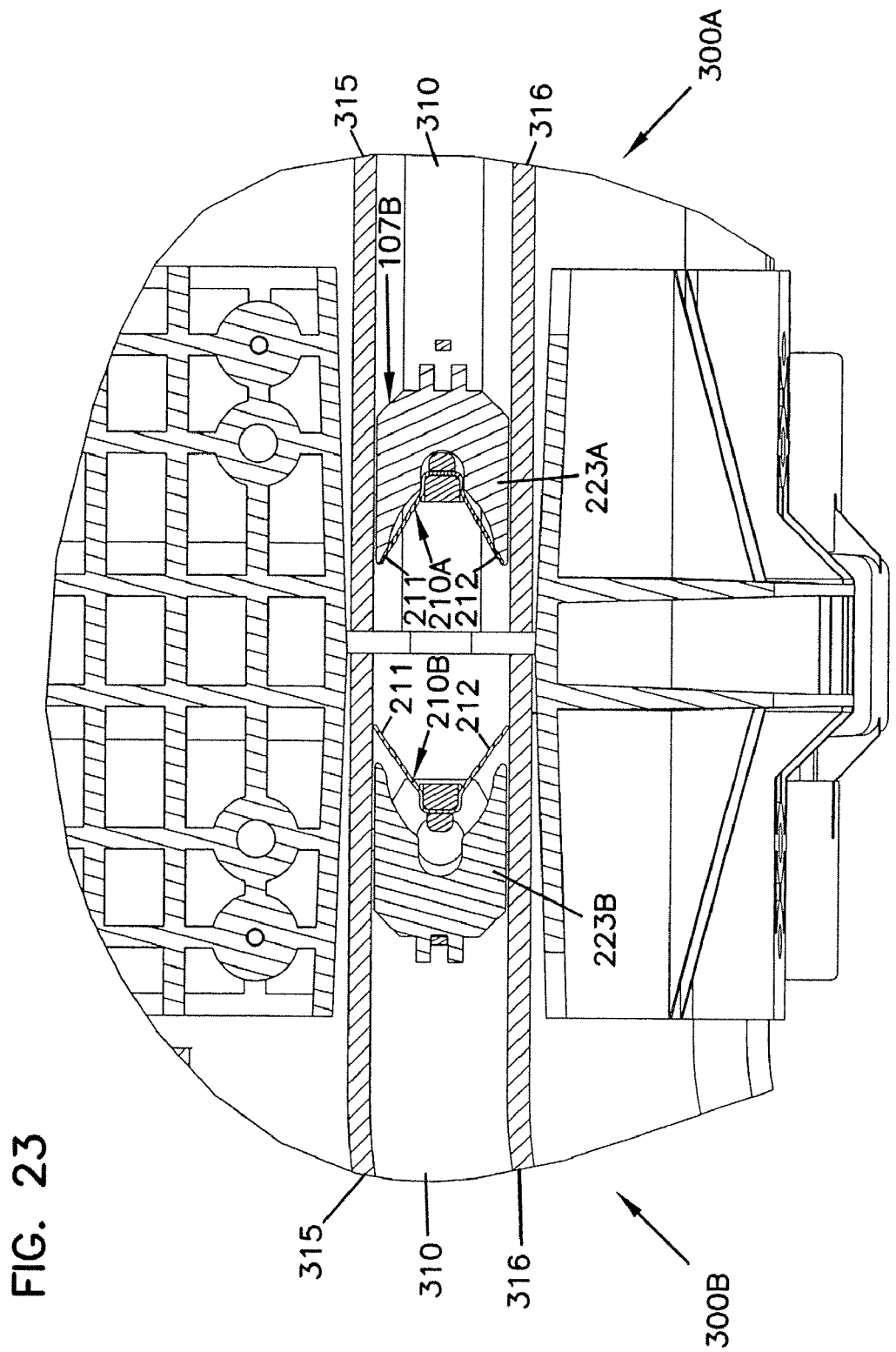
FIG. 23 is an enlarged cross-sectional view taken along line 23-23 of FIG. 21 showing a portion of the trough system including a locking element.

As shown in the cross-sectional view of FIG. 23 taken along line 23-23 of FIG. 21, the springs 210A and 210B and finger portions 223A and 223B of locking element 107B are positioned within the slot 310 of the trough members 300A and 300B. With a finger portion, such as finger portion 223B, in the locked position, the spring arms 211 and 212 of the spring 210B resiliently engage opposing portions 315 and 316 of the slot 310, thereby maintaining the locking element 107B within the slot 310 and coupling the coupler 100 to the trough member 300B.

The opposing portions 315 and 316 each extend generally parallel to the longitudinal direction 190 of the coupler 100. Likewise, the forces applied by the spring arms 211 and 212 are generally exerted in opposite directions aligned in a plane extending generally parallel to the longitudinal direction 190 of the coupler 100 along one of the walls of the trough.

In contrast, with a finger portion, such as finger portion 223A, in the unlocked position, the fingers 224 and 226 fully engage spring arms 211 and 212 of the spring 210A, pushing the arms towards each other and away from the portions 315 and 316 so that the trough member 300A can be slid in the longitudinal direction 190 out of the coupler 100, thereby uncoupling the trough member 300A from the coupler 100.

The other locking elements 107A, 107C, and 107D function in a manner similar to that of the locking element 107B illustrated.

IV. Method of Use

An example method for coupling one or more trough members to the coupler 100 in accordance with the present invention is as follows. The locking elements 107A, 107B, 107C, and 107D may be in the unlocked or locked position. The terminal end 302 of the trough member 300A may be inserted into the coupler 100, thereby causing the spring 210A and spring release 220A portions of each locking element 107A, 107B, 107C, and 107D to be received in the slots 310 of the trough member 300A. The angled shape of the spring arms 211 and 212 of each spring is angled toward the direction of insertion of the terminal end 302 of the trough member 300A to allow the trough member 300A to be inserted with little resistance from the spring.

With the trough member 300A fully inserted into the coupler 100 and the locking elements in the locked position, the spring arms 211 and 212 of each spring push against opposing portions 315 and 316 of each slot 310. Removal of the trough member 300A is resisted by the angled shape of the arms 211 and 212 and ends of the arms grasping or embedding into the opposing portions 315 and 316 of the trough member 300A. The second trough member 300B may be coupled to the second coupler end 111 of the coupler 100 in a similar manner.

An example method of removing the trough member 300A in accordance with the present invention includes sliding the spring release 220A of each locking element to the unlocked position, thereby removing the pushing force of the spring arms 211 and 212 from the opposing portions 315 and 316 of the slots 310. The trough member 300A may then be removed. The second trough member 300B may be removed in a similar fashion.

Alternative embodiments to those provided herein are also possible. For example, it is possible to alter the configuration of the engagement between the locking elements and the slots on the trough members. For example, it may only be necessary to provide a spring with a single spring arm that engages an opposing portion (e.g., a flange) of the trough. In addition, a separate fastener, such as a screw, could also be used in combination with the locking elements.

The coupler 100 and trough members 300, 300A, and 300B are presented herein by way of example only, and other configurations are possible. For example, a coupler may be configured to be coupled to more than two trough members, therefore including more than the first and second coupler ends. Further, a greater number of locking elements and/or springs may be presented for each coupler end, or, alternatively, fewer locking elements and/or springs, for example, one, may be used.

The above specification, examples and data provide a complete description of the manufacture and of the invention. Since many embodiments of the invention can be made without departing from the spirit and scope of the invention, the invention resides in the claims hereinafter appended.

What is claimed is:

1. A method for using a coupler and a trough member, the method comprising steps of:
   providing a first terminal end of the trough member coupled to the coupler, wherein the first terminal end was inserted in a longitudinal direction into a spacing defined by the coupler, the longitudinal direction extending along the trough member from the first terminal end to a second opposite terminal end;
   sliding a spring release in the longitudinal direction to disengage a spring from portions of the trough member defining a slot; and
   removing the first terminal end of the first trough member from the spacing.

2. The method of claim 1, wherein the sliding step further comprises a step of sliding the spring release in the longitudinal direction to disengage first and second arms of the spring from opposing portions of the trough member defining the slot.

3. The method of claim 1, wherein the sliding step further comprises a step of compressing first and second arms of the spring in opposing directions generally aligned in a plane generally parallel to that of the longitudinal direction.

4. The method of claim 1, wherein the sliding step further comprises a step of sliding the spring release in the longitudinal direction to compress first and second arms of the spring from opposing portions of the trough member defining the slot, the first and second arms of the spring being aligned in a plane generally parallel to that of the longitudinal direction.

5. The method of claim 1, further comprising forming the slot along a side of the trough member, the slot including first and second wall portions that define the slot therebetween, the first and second wall portions extending along the wall in the longitudinal direction.

6. A method for using a coupler and a trough member, the method comprising steps of:
   providing a first terminal end of the trough member, the trough member including a wall having first and second wall portions that define a partially-closed slot therebetween, the first and second wall portions extending along the wall in a longitudinal direction, the longitudinal direction extending along the trough member from the first terminal end to a second opposite terminal end;
   providing a coupler defining a spacing and including a locking element with a spring; and
   inserting the first terminal end of the trough member in the longitudinal direction into the spacing defined by the coupler so that the locking element is at least partially received in the slot, thereby coupling the first terminal end of the trough member to the coupler.

7. The method of claim 4, further comprising forming the slot along a side of the trough member, the slot including first and second wall portions that define the slot therebetween, the first and second wall portions extending along the wall in the longitudinal direction.

8. The method of claim 6, further comprising sliding a spring release in the longitudinal direction to compress first and second arms of the spring such that the first and second arms disengage the first and second wall portions of the wall of the trough member, the first and second wall portions opposing one another.

* * * * *